US012754794B2

(12) United States Patent
Rani et al.

(10) Patent No.: US 12,754,794 B2
(45) Date of Patent: Oct. 6, 2026

(54) INTELLIGENT LOGGING OF MICROSERVICE FAILURES

(71) Applicant: International Business Machines Corporation, Armonk, NY (US)

(72) Inventors: Madhavi Rani, Hyderabad (IN); Avneet Kaur Nanda, Delhi (IN); Pravin Kailashnath Kedia, Mumbai (IN); Abhishek Jain, Baraut (IN)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 18/146,877

(22) Filed: Dec. 27, 2022

(65) Prior Publication Data

US 2024/0211337 A1 Jun. 27, 2024

(51) Int. Cl.
*G06F 11/34* (2006.01)
*G06F 11/07* (2006.01)

(52) U.S. Cl.
CPC ........ *G06F 11/079* (2013.01); *G06F 11/3476* (2013.01)

(58) Field of Classification Search
CPC ............... G06F 11/079; G06F 11/3476; G06F 11/3466; G06F 11/3495
See application file for complete search history.

(56) References Cited

U.S. PATENT DOCUMENTS 7,506,314 B2 3/2009 Kollmann et al.
10,048,996 B1 * 8/2018 Bell .................... G06F 11/3006
10,511,690 B1 * 12/2019 Chatterjee ............. H04L 41/149
10,684,940 B1 6/2020 Kayal et al.
11,561,849 B1 * 1/2023 Kairali .................. G06F 11/008
2008/0250265 A1 * 10/2008 Chang ................... G06F 11/008 714/4.12
2014/0067886 A1 * 3/2014 Sakanashi ............. G06F 11/366 707/825
2016/0124823 A1 5/2016 Ruan et al.
2016/0191562 A1 6/2016 Yin
2017/0063762 A1 3/2017 Machoi et al.
2018/0157713 A1 6/2018 Huang et al.
(Continued)

FOREIGN PATENT DOCUMENTS

CN 114385433 A 4/2022

OTHER PUBLICATIONS

Wikipedia's Bootstrap Aggregating historical version published Jul. 2022 https://en.wikipedia.org/w/index.php?title=Bootstrap_aggregating&oldid=1100814936 (Year: 2022).*
(Continued)

*Primary Examiner* — Joseph O Schell
(74) *Attorney, Agent, or Firm* — Yee & Associates, P.C.

(57) ABSTRACT

Intelligent logging of microservice failures is provided. It is predicted that failure of a microservice in a microservice chain will occur during a predicted high-risk failure period for a predicted failure type while performing a transaction corresponding to an application. A detailed logging level is determined for the microservice to record sufficient information to identify a root cause of the failure of the microservice for the predicted failure type. The microservice is directed to increase a current logging level of the microservice to the detailed logging level during the predicted high-risk failure period to record sufficient information to identify the root cause of the failure of the microservice.

19 Claims, 5 Drawing Sheets

(56) References Cited

U.S. PATENT DOCUMENTS

| | | | | |
|---|---|---|---|---|
| 2019/0102244 | A1* | 4/2019 | Tarlano | G06F 11/0787 |
| 2019/0121688 | A1* | 4/2019 | Nakatani | G06F 11/0751 |
| 2019/0391891 | A1* | 12/2019 | Gupta | G06N 3/09 |
| 2021/0306321 | A1 | 9/2021 | Calegari et al. | |
| 2021/0397965 | A1* | 12/2021 | Zhang | G06N 3/04 |
| 2022/0053024 | A1* | 2/2022 | Byron | H04L 63/1416 |
| 2022/0147409 | A1 | 5/2022 | Linck et al. | |
| 2022/0263858 | A1* | 8/2022 | Bargnesi | H04L 63/1425 |
| 2022/0398150 | A1* | 12/2022 | Chopra | G06F 11/0751 |
| 2023/0108359 | A1* | 4/2023 | Ganesan | G06F 11/3423<br>714/45 |
| 2024/0103954 | A1* | 3/2024 | Chen | G06F 11/0781 |

OTHER PUBLICATIONS

Zwietasch, "Online Failure Prediction for Microservice Architectures," Master's Thesis, Institute of Software Technology Reliable Software Systems, University of Stuttgart, Aug. 7, 2017, 105 pages.

Zhou et al., "Latent Error Prediction and Fault Localization for Microservice Applications by Learning from System Trace Logs," 27th ACM Joint European Software Engineering Conference and Symposium on the Foundations of Software Engineering (ESEC/FSE'19), Tallinn, Estonia, Aug. 26-30, 2019, 14 pages. https://ink.library.smu.edu.sg/sis_research/4636/.

Anonymous, "System and Method to Automatically Recommend Logging Using Crowdsource Data and NLP for Code," An IP.com Prior Art Database Technical Disclosure, IPCOM000266656D, Aug. 5, 2021, 7 pages.

Gupta, "Decision Trees in Machine Learning," Towards Data Science, May 17, 2017, accessed Dec. 7, 2022, 7 pages. https://towardsdatascience.com/decision-trees-in-machine-learning-641b9c4e8052.

Ye, "Classify A Rare Event Using 5 Machine Learning Algorithms," Towards Data Science, Oct. 19, 2019, Accessed on Dec. 7, 2022, 20 pages. https://towardsdatascience.com/classifying-rare-events-using-five-machine-learning-techniques-fab464573233.

* cited by examiner

INTELLIGENT LOGGING OF MICROSERVICE FAILURES

BACKGROUND

1. Field

The disclosure relates generally to microservices and more specifically to intelligent logging of microservice failure in a microservice chain performing a transaction corresponding to a cloud native application.

2. Description of the Related Art

Microservices (also known as a microservices architecture) are a cloud native architecture in which a single application is composed of many loosely coupled and independently deployable smaller components, or microservices. Each microservice is a self-contained piece of functionality. A service mesh instruments a plurality of different microservices and directs communications traffic between the plurality of different microservices according to a predefined configuration. In other words, a user, such as, for example, a system administrator, can provide a configuration to the service mesh and have the service mesh perform a transaction using the plurality of different microservices. The plurality of different microservices comprise a microservice chain corresponding to the cloud native application. The service mesh connects, manages, and secures the plurality of different microservices in, for example, a container orchestration architecture such as Kubernetes® (a registered trademark of the Linux Foundation of San Francisco, California, U.S.A.). Each microservice in the microservice chain has a different functionality with downstream relationships. In other words, the microservice chain executes a sequence of functionalities to complete a transaction that corresponds to the cloud native application.

In general, applications generate logs to record various events, operations, and activities during application runtime for auditing and debugging purposes. Typically, applications write logs to persistent storage so that if an application fails, these logs can be analyzed to understand the root cause of a particular failure. Applications can be configured at different logging levels. Currently, users change these logging levels manually and then restart the applications to implement the logging level changes. However, this static way of changing the logging level of an application has issues.

For example, in most production applications, logging is configured to record only critical events. Only logging critical events saves storage space. However, if an application fails between critical events, then program developers or support personnel will not receive clues as to why the application failed because logging non-critical events was not enabled on the application. In this example, non-critical event logging was needed to be enabled to identify the root cause of the failure.

More detailed logging is needed by program developers or support personnel to scrutinize the logs to determine the root cause of the failure. An application failure can be recreated by simulating the error environment. However, by simulating the error environment to recreate the application failure, obtaining the same logs as that of the actual error case may not be possible. Detailed logging is needed at the time of actual application failure occurrence, rather than getting the logs from a simulated error environment.

Further, even if an application is configured for detailed logging, other supporting information, such as, for example, memory or thread dumps, environment configuration information, input/output parameters, and the like, is sometimes needed to identify the root cause or reason for the application failure. Generally, this other supporting information is only collected manually on demand and is not always available. As a result, when all the relevant information related to a failure event is not available, failure diagnosis is slower and less accurate.

SUMMARY

According to one illustrative embodiment, a computer-implemented method for intelligent logging of microservice failures is provided. A computer, using a rule-based classifier, predicts that failure of a microservice in a microservice chain will occur during a predicted high-risk failure period for a predicted failure type while performing a transaction corresponding to an application. The computer determines a detailed logging level for the microservice to record sufficient information to identify a root cause of the failure of the microservice for the predicted failure type. The computer directs the microservice to increase a current logging level of the microservice to the detailed logging level during the predicted high-risk failure period to record sufficient information to identify the root cause of the failure of the microservice. According to other illustrative embodiments, a computer system and computer program product for intelligent logging of microservice failures are provided.

As a result, the illustrative embodiments eliminate the need to reproduce the failure scenario in a simulated environment and enable the microservice chain to run as usual in a normal case without manual restart of the microservice to implement the logging level change and without modification of the microservice code.

The illustrative embodiments also optionally generate, using the rule-based classifier, a classification decision tree based a plurality of features corresponding to the transactions, and remove a set of features having low importance for the transactions from the classification decision tree using weakest link weight-based pruning to increase accuracy of failure risk classifications by the rule-based classifier. Further, the illustrative embodiments optionally reduce variance in predictions for microservice failures for particular failure types by the rule-based classifier utilizing at least one of a bagging technique or a boosting technique on the rule-based classifier.

As a result, the illustrative embodiments increase the accuracy of failure risk classifications and reduce variance in predictions for microservice failures, thus improving performance.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
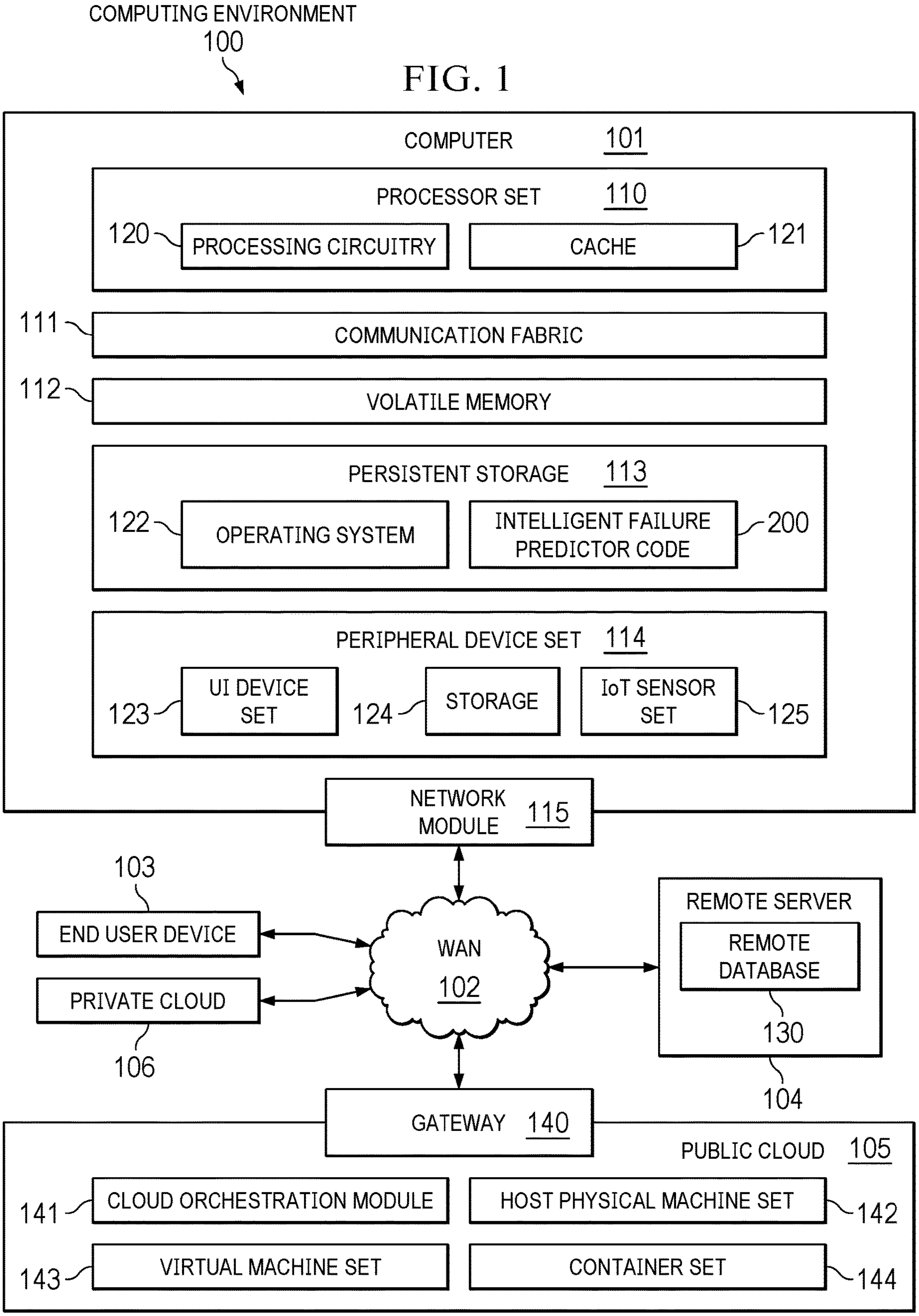
FIG. 1 is a pictorial representation of a computing environment in which illustrative embodiments may be implemented.
Figure 2:
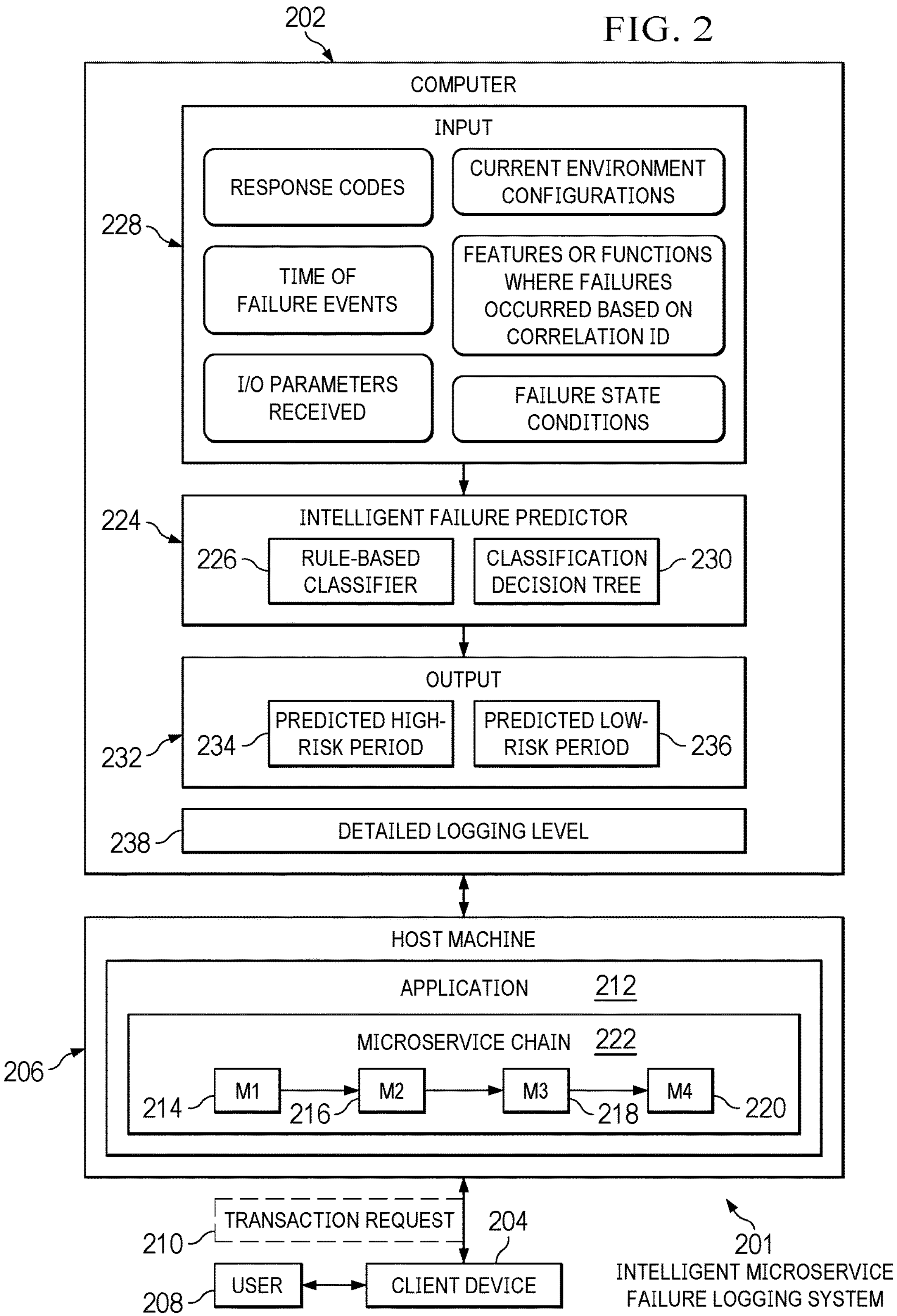
FIG. 2 is a diagram illustrating an example of an intelligent microservice logging system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as intelligent failure predictor code 200. For example, intelligent failure predictor code 200 predicts in advance when a microservice failure will occur and automatically instructs the microservice to increase its current logging level to a more detailed, elaborate, or verbose level of logging at the time of the predicted failure in order to collect sufficient information or evidence to identify a root cause of the failure for a program developer or support team to debug the microservice quickly and correctly. Based on the success or failure of a transaction, intelligent failure predictor code 200 records the microservice logs to a configured output channel (e.g., a shared log file, database, or the like). Intelligent failure predictor code 200 records the more detailed logs with traces and memory dumps for certain periods of time when a predicted high likelihood of microservice failure exists. Thus, intelligent failure predictor code 200 eliminates the need of reproducing a failed transaction scenario in a simulation environment and allows the microservice chain of the application to run without manual restart to implement the logging level change for the predicted microservice failure.

In addition to intelligent failure predictor code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and intelligent failure predictor code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in intelligent failure predictor code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory, but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The intelligent failure predictor code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (for example, a customer of an entity that operates computer 101), and may take any of the forms discussed above in connection with computer 101. EUD 103 typically receives helpful and useful data from the operations of computer 101. For example, in a hypothetical case where computer 101 is designed to provide a microservice logging level recommendation to an end user, this microservice logging level recommendation would typically be communicated from network module 115 of computer 101 through WAN 102 to EUD 103. In this way, EUD 103 can display, or otherwise present, the microservice logging level recommendation to the end user. In some embodiments, EUD 103 may be a client device, such as thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a microservice logging level recommendation based on historical transaction failure data, then this historical transaction failure data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" May be, for example, without limitation, two of item A; one of item B; and ten of item C; four of item B and seven of item C; or other suitable combinations.

In a typical microservice-based application, a single transaction involves multiple microservices included in a microservice chain and each microservice in the chain generates a log corresponding to performance of its portion of the transaction. Illustrative embodiments identify logs corresponding to the same transaction using the same unique transaction identifier or correlation identifier. Typically, these logs from different microservice chains are collated to the configured log output channel (e.g., shared file storage, database, log forwarder and aggregator, or the like) for sharing.

Generally, logging is enabled only for critical events in a production environment to save storage space. This may be sufficient for obtaining insights into successful microservice transactions. However, in the case of failure, detailed logging is needed to identify the root cause of a particular microservice failure. Currently, to obtain detailed logs, a user needs to manually modify the logging level to a more granular level and then restart the microservice to implement the logging level change. After changing the logging level and implementing the change by restarting the microservice, the user needs to simulate that same failure scenario to capture the detailed logs needed to determine the root cause of the microservice failure.

Consequently, a solution is needed to predict when a microservice failure will occur in a microservice chain of a cloud native application and automatically determine the appropriate logging level to collect sufficient detailed information to identify the root cause or reason for the microservice failure in order for a program developer or support team to debug that particular microservice quickly and correctly. Illustrative embodiments predict the time when a microservice failure will occur and direct the microservice to automatically change from a current logging level to a more detailed level of logging to collect sufficient information to determine the root cause of the microservice failure. Illustrative embodiments predict which microservice in the microservice chain will fail so that the microservice can record the more detailed logs at the predicted time of the failure with sufficient information for debugging and send the detailed logs to the configured output channel. By predicting the microservice failure in advance and increasing the logging level of the microservice at the time of the predicted failure, illustrative embodiments eliminate the need to reproduce the failure scenario in a simulated environment and enable the microservice chain to run as usual in a normal case without manual restart of the microservice to implement the logging level change and without modification of the microservice code.

Illustrative embodiments utilize an intelligent failure predictor, which runs as a controller in the microservices architecture, to predict microservice failure. The intelligent failure predictor uses a machine learning model, such as, for example, a rule-based classifier or the like, to predict "high-risk" periods for microservice failure in advance. Illustrative embodiments train the intelligent failure predictor during microservice initial test phases and bring-up run cycles using historical microservice transaction logs to identify all potential positive and negative transaction scenarios. Then, after training, the intelligent failure predictor instructs or directs a given microservice in the microservice chain of the application to automatically change to an increased level of detailed logging during the predicted high-risk period for failure of that particular microservice.

The intelligent failure predictor receives subscriptions for the transaction failure prediction services of illustrative embodiments from applications comprised of microservice chains that perform transactions corresponding to the applications. The intelligent failure predictor intercepts all transaction data corresponding to a microservice chain of an application, which is subscribed to the transaction failure prediction service of illustrative embodiments, generates a knowledge corpus of historical transaction data to predict future transaction failure or success for each respective microservice comprising the microservice chain of the application, and determines an appropriate logging level for a predicted microservice failure. The intelligent failure predictor stores the microservice transaction failure or success predictions in its database for obtaining prediction insights. If a subscribing application has elected to receive automatic notification for a transaction failure prediction, then the intelligent failure predictor notifies the microservice regarding the future predicted time of the failure. Otherwise, the subscribing application can poll the intelligent failure predictor on a regular time interval basis for predicted microservice failure or as needed on demand.

Moreover, the intelligent failure predictor can predict an expected failure type so that a microservice can change the logging level for that particular failure type. The predicted failure type can be, for example, one of a management failure type, a computing failure type, a data failure type, a network failure type, or the like. Illustrative embodiments also predict microservice failure impact and duration so that illustrative embodiments can differentiate between high and low failure risk periods for a given microservice. Illustrative embodiments generate the knowledge corpus of historical transaction data to train the intelligent failure predictor for a microservice chain of an application during its testing cycle and initial run cycle in the production environment.

Applications subscribe to the intelligent failure predictor service in such a way that: if an application has selected to receive automatic notification for microservice failure prediction, then the intelligent failure predictor automatically notifies the application regarding a predicted microservice failure and instructs that particular microservice to increase its level of logging to a detailed logging level. Otherwise, the application can poll to the intelligent failure predictor on a regular time interval basis or as needed on demand.

During the testing phase and initial run cycle of the application when being deployed and started for the first time, the intelligent failure predictor performs a series of steps. For example, the intelligent failure predictor analyzes the microservice chain of the application to identify each respective microservice in the microservice chain. In addition, the intelligent failure predictor intercepts every transaction with its status (i.e., successful status or failed status) to generate the knowledge corpus of different transactions. Further, the intelligent failure predictor identifies the transaction failure type, such as, for example, a management failure type, a computing failure type, a data failure type, a network failure type, or the like. The intelligent failure predictor continues to intercept transaction data, along with transaction failure type information, until the intelligent failure predictor has generated a sufficient knowledge corpus to accurately predict microservice failures.

Illustrative embodiments train the intelligent failure predictor by feeding both positive transaction outcomes and negative transaction outcomes into the intelligent failure predictor during test and initial run cycles of the application. Illustrative embodiments utilize, for example, a weakest link weight-based pruning methodology to remove features of low importance while achieving correct classifications decisions by the intelligent failure predictor. Illustrative embodiments can also utilize bagging and boosting techniques to reduce variance in predictions by the intelligent failure predictor for microservice failure events of culprit microservices for a particular type of transaction.

Illustrative embodiments generate a rule-based decision tree based on microservice conditions or behaviors using, for example, a decision tree classification algorithm. When a percentage of microservice transaction logs satisfy a condition of a particular rule, illustrative embodiments classify those microservice transaction logs as high or low failure risk conditions. It should be noted that one microservice transaction log can satisfy or trigger multiple rules. Votes for each rule class depend on, for example, time of failure event, response code, environment configuration, failure state condition, and the like based on configurable weights corresponding to the application type. Illustrative embodiments utilize weight-based pruning of the rule-based decision tree to reduce variance and improve classification success in the intelligent failure predictor.

Once illustrative embodiments have trained the intelligent failure predictor to accurately predict future microservice failures, the intelligent failure predictor stores, for example, time of the predicted microservice failure, failure type, identifier of the predicted failed microservice in the microservice chain, application details, and the like in a database of the intelligent failure predictor. Based on the type of subscription (e.g., notification or polling), the intelligent failure predictor starts propagating results to respective microservices of the application. The intelligent failure predictor will instruct a microservice to dynamically change its current logging level to an increased level of detailed logging at the predicted time of microservice failure only.

With the current trend toward utilization of microservices, maintenance of these distributed applications is difficult when proper logging practices are not set in place. Capturing logs at the appropriate logging level is important to identify anomalies in the microservice chain of the application. Illustrative embodiments relieve the user from the hassle of manually changing the logging level of a microservice, restarting the microservice to implement the logging level change, and recreating the error scenario to collect the logs regarding the failure. Illustrative embodiments ensure that all needed information is collected to identify the anomalous behavior of the application (i.e., root cause of the microservice failure).

As a result, illustrative embodiments enable decreased effort by the user after a failure event is logged. Illustrative embodiments provide faster resolution of the failure, decreased turn-around time, and increased user satisfaction by recording all the needed information at a detailed logging level at the predicted time of microservice failure occurrence. No manual effort by a user is needed to change the logging level. Illustrative embodiments enable decreased microservice failure resolution time because of the availability of all the needed information.

Thus, illustrative embodiments provide one or more technical solutions that overcome a technical problem with a microservice logging sufficient information to determine the root cause of the microservice failure. As a result, these one or more technical solutions provide a technical effect and practical application in the field of microservices.

With reference now to FIG. 2, a diagram illustrating an example of an intelligent microservice logging system is depicted in accordance with an illustrative embodiment. Intelligent microservice logging system 201 may be implemented in a computing environment, such as computing environment 100 in FIG. 1. Intelligent microservice logging system 201 is a system of hardware and software components for intelligently logging microservice failures during predicted periods of high failure risk.

In this example, intelligent microservice logging system 201 includes computer 202, client device 204, and host machine 206. Computer 202, client device 204, and host machine 206 may be, for example, computer 101, EUD 103, and host physical machine set 142, respectively, in FIG. 1. However, it should be noted that intelligent microservice logging system 201 is intended as an example only and not as a limitation on illustrative embodiments. For example, intelligent microservice logging system 201 can include any number of computers, client devices, host machines, and other devices and components not shown.

User 208 utilizes client device 204 to send transaction request 210 to application 212, which resides on host machine 206. However, in an alternative illustrative embodiment, application 212 can reside on computer 202. Application 212 can represent any type of application, such as, for example, a banking application, financial application, entertainment application, healthcare application, insurance application, governmental application, educational application, gaming application, or the like, which is capable of performing a set of transactions. In this example, application 212 is comprised of microservice M1 214, microservice M2 216, microservice M3 218, and microservice M4 220, which form microservice chain 222. However, it should be noted that application 212 is intended as an example only and can be comprised of more or fewer microservices than shown. Application 212 utilizes microservice chain 222 to execute the transaction corresponding to transaction request 210 received from user 208 via client device 204.

Computer 202 includes intelligent failure predictor 224. Intelligent failure predictor 224 can be implemented in, for example, intelligent failure predictor code 200 in FIG. 1. Computer 202 utilizes intelligent failure predictor 224 to predict a failure of a microservice in microservice chain 222 while performing a transaction corresponding to application 212. It should be noted that application 212 is a subscribing application to the failure prediction services provided by computer 202.

Intelligent failure predictor 224 includes rule-based classifier 226. Rule-based classifier 226 is a machine learning component, which is trained via supervised learning. Intelligent failure predictor 224 trains rule-based classifier 226 utilizing historical transaction data (e.g., successful transactions, failed transactions, expected transaction outcomes, unexpected transaction outcomes, and the like) collected during testing and initial run cycles of application 212. For example, intelligent failure predictor 224 utilizes input 228 as training data for rule-based classifier 226. In this example, input 228 includes response codes to previous transaction requests, time of microservice failure events, I/O parameters received during microservice failure events, current environment configurations during microservice failure events, features and functions where microservice failures occurred based on the correlation or transaction identifier, and microservice failure state conditions. However, input 228 is intended as an example only and can include more or less information than shown.

Based on some or all of input 228, rule-based classifier 226 generates classification decision tree 230. Rule-based classifier 226 utilizes classification decision tree 230 to generate output 232. Output 232 includes predicted high-risk period 234 and low-risk period 236 for microservice failure. Based on predicted high-risk period 234 for microservice failure, intelligent failure predictor 224 determines detailed logging level 238 for the microservice (e.g., microservice M3 218) predicted to fail during the high-risk period. Intelligent failure predictor 224 instructs microservice M3 218, which is predicted to fail, to increase its current logging level to detailed logging level 238 during predicted high-risk period 234 to record sufficient information to determine the root cause or reason for the failure.

Figure 3:
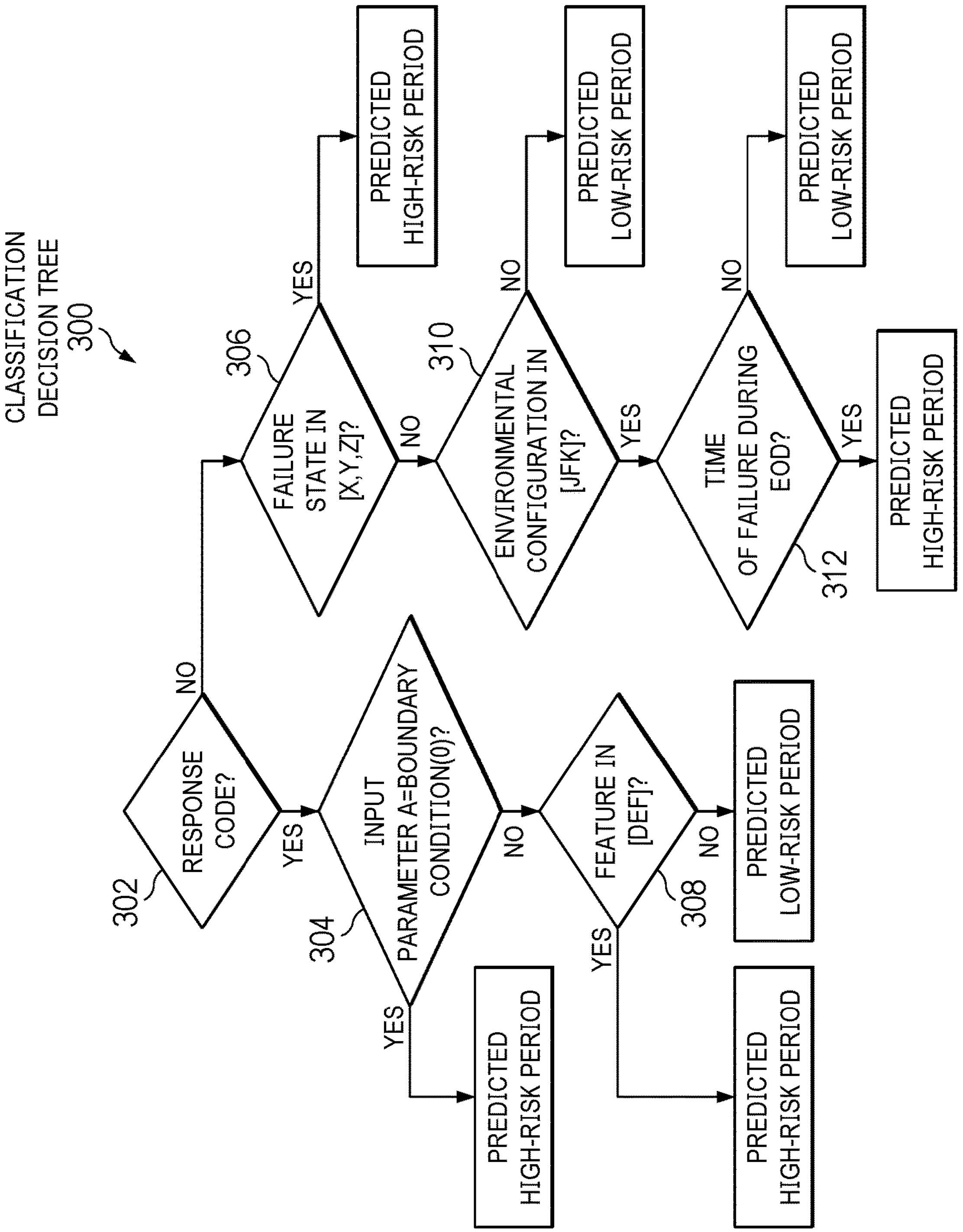
FIG. 3 is a diagram illustrating an example of a classification decision tree in accordance with an illustrative embodiment.

With reference now to FIG. 3, a diagram illustrating an example of a classification decision tree is depicted in accordance with an illustrative embodiment. Classification decision tree 300 can be, for example, classification decision tree 230 in FIG. 2. In this example, classification decision tree 300 includes node 302, node 304, node 306, node 308, node 310, and node 312. However, classification decision tree 300 is intended as an example only and can include any number of nodes. Node 302 is a root node and nodes 304-312 are leaf nodes. Also, a left edge from a node represents a positive outcome ("Yes") and a right edge from a node represents a negative outcome ("No").

For example, node 302 represents a decision "Response Code?" to a transaction request, such as, for example, transaction request 210 in FIG. 2. Positive outcome for node 302 is node 304 and negative outcome for node 302 is node 306. Node 304 represents the decision is "Input Parameter A equal to Boundary Condition (0)?" Positive outcome for node 304 is a predicted high-risk period. Negative outcome for node 304 is node 308, which represents the decision is "Feature in [DEF]?" Positive outcome of node 308 is a predicted high-risk period. Negative outcome of node 308 is a predicted low-risk period.

Node 306 represents the decision is "Failure State in [X,Y,Z]?" Positive outcome for node 306 is a predicted high-risk period. Negative outcome for node 306 is node 310, which represents the decision is "Environment Condition in [JKF]?" Positive outcome of node 310 is node 312, which represents the decision is "Time of Failure During EOD?" Positive outcome of node 312 is a predicted high-risk period. Negative outcome of node 312 is a low-risk period. Negative outcome of node 310 is a predicted low-risk period.

Figure 4A:
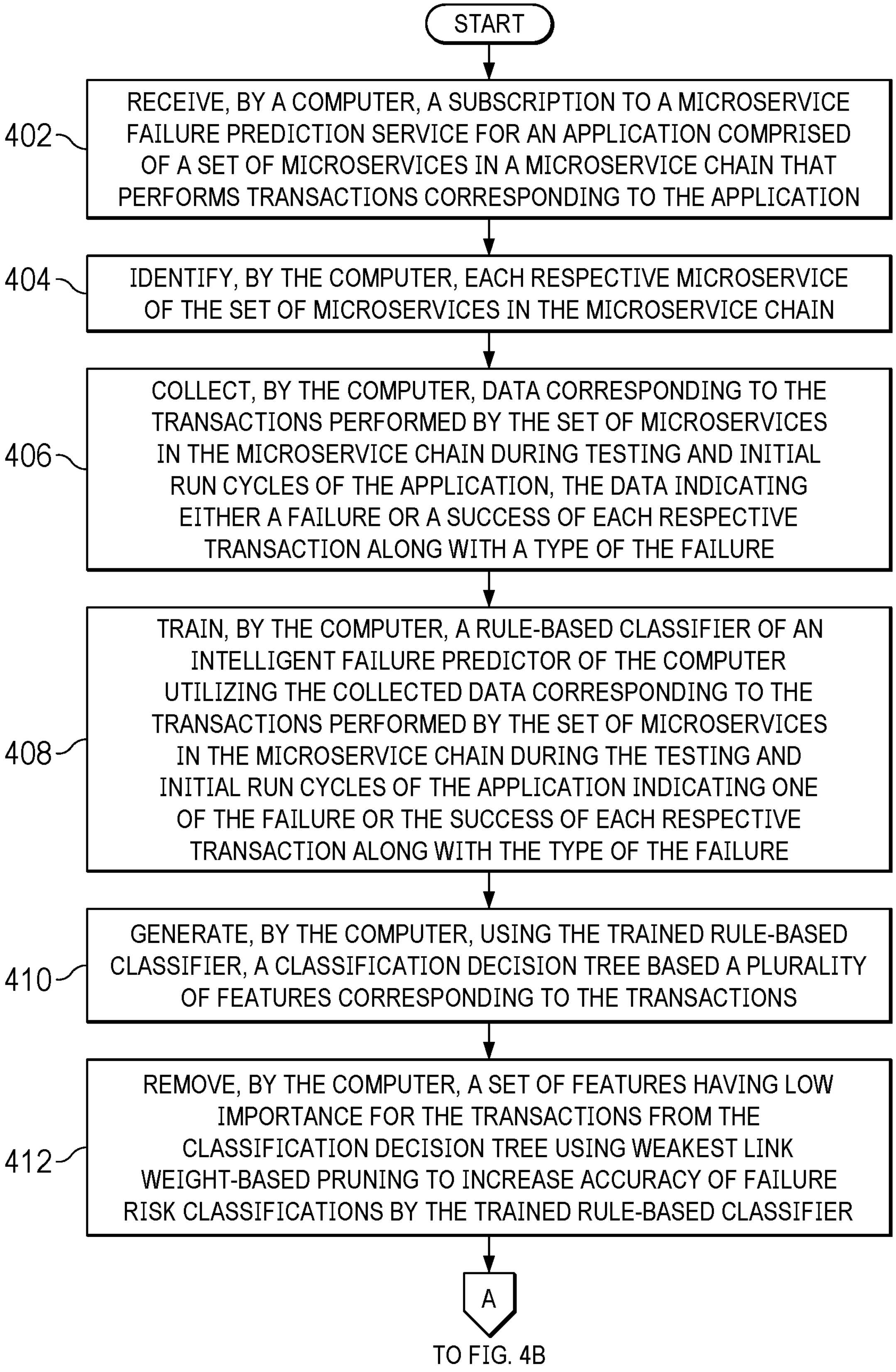
FIGS. 4A-4B are a flowchart illustrating a process for intelligent logging of microservice failures in accordance with an illustrative embodiment.
Figure 4B:
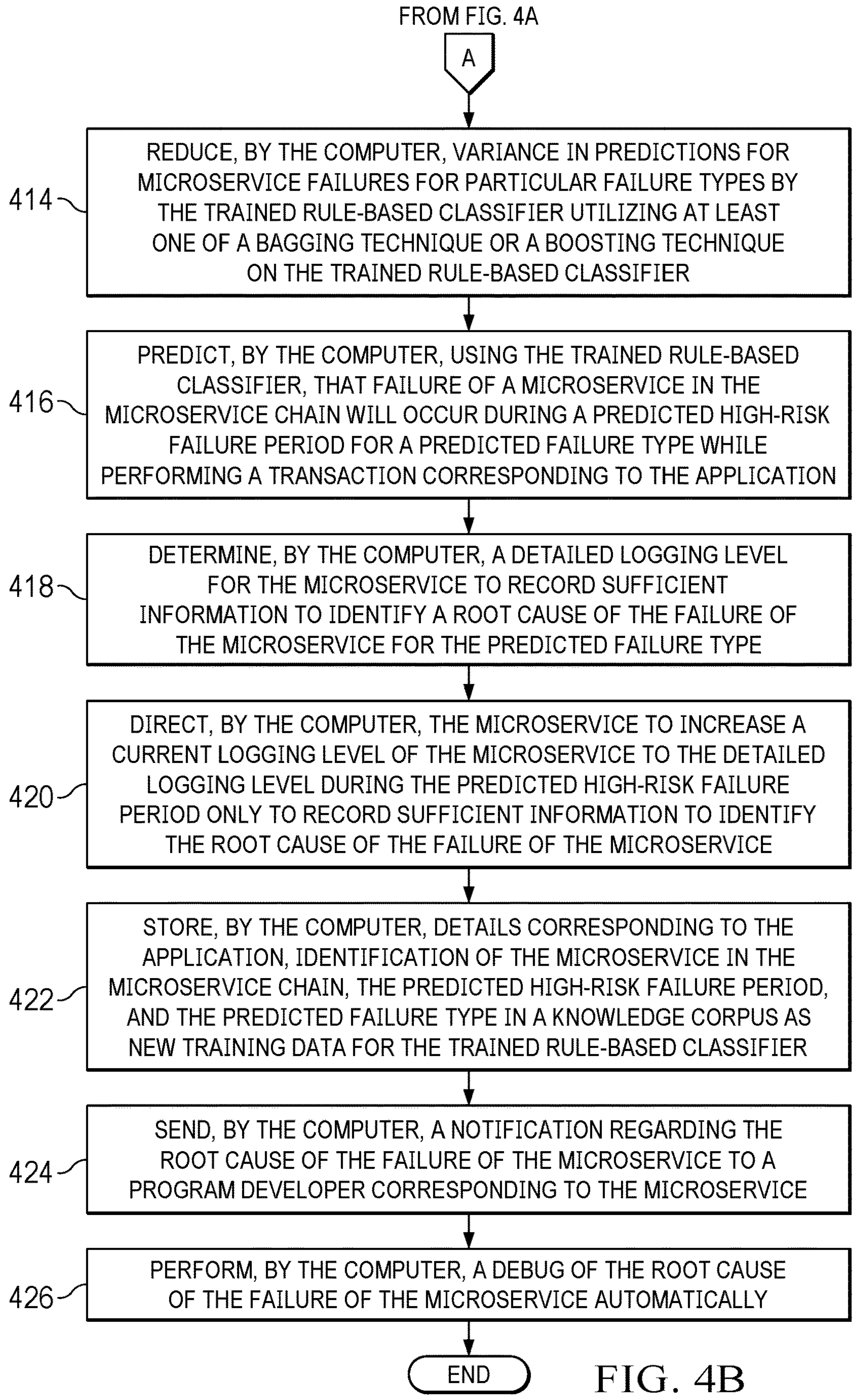

With reference now to FIGS. 4A-4B, a flowchart illustrating a process for intelligent logging of microservice failures is shown in accordance with an illustrative embodiment. The process shown in FIGS. 4A-4B may be implemented in a computer, such as, for example, computer 101 in FIG. 1 or computer 202 in FIG. 2. For example, the process shown in FIGS. 4A-4B may be implemented in intelligent failure predictor code 200 in FIG. 1 or intelligent failure predictor 224 in FIG. 2.

The process begins when the computer receives a subscription to a microservice failure prediction service for an application comprised of a set of microservices in a microservice chain that performs transactions corresponding to the application (step 402). In response to receiving the subscription, the computer identifies each respective microservice of the set of microservices in the microservice chain (step 404). In addition, the computer collects data corresponding to the transactions performed by the set of microservices in the microservice chain during testing and initial run cycles of the application (step 406). The data indicating either a failure or a success of each respective transaction along with a type of the failure.

Further, the computer trains a rule-based classifier of an intelligent failure predictor of the computer utilizing the collected data corresponding to the transactions performed by the set of microservices in the microservice chain during the testing and initial run cycles of the application indicating one of the failure or the success of each respective transaction along with the type of the failure (step 408). Furthermore, the computer, using the trained rule-based classifier, generates a classification decision tree based a plurality of features corresponding to the transactions (step 410). Moreover, the computer removes a set of features having low importance for the transactions from the classification decision tree using weakest link weight-based pruning to increase accuracy of failure risk classifications by the trained rule-based classifier (step 412). The computer also reduces variance in predictions for microservice failures for particular failure types by the trained rule-based classifier utilizing at least one of a bagging technique or a boosting technique on the trained rule-based classifier (step 414). Thus, by increasing the accuracy of failure risk classifications by the trained rule-based classifier and reducing the variance in predictions for microservice failures by the trained rule-based classifier, illustrative embodiments increase performance of the computer, itself.

The computer, using the trained rule-based classifier, predicts that failure of a microservice in the microservice chain will occur during a predicted high-risk failure period for a predicted failure type while performing a transaction corresponding to the application (step 416). The computer determines a detailed logging level for the microservice to record sufficient information to identify a root cause of the failure of the microservice for the predicted failure type (step 418). The computer directs the microservice to increase a current logging level of the microservice to the detailed logging level during the predicted high-risk failure period only to record sufficient information to identify the root cause of the failure of the microservice (step 420).

The computer stores details corresponding to the application, identification of the microservice in the microservice chain, the predicted high-risk failure period, and the predicted failure type in a knowledge corpus as new training data for the trained rule-based classifier (step 422). The computer sends a notification regarding the root cause of the failure of the microservice to a program developer corresponding to the microservice (step 424). The computer performs a debug of the root cause of the failure of the microservice automatically if possible (step 426). Thereafter, the process terminates.

Thus, illustrative embodiments of the present invention provide a computer-implemented method, computer system, and computer program product for intelligent logging of microservice failure in a microservice chain during a high failure risk period. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for intelligent logging of microservice failures, the computer-implemented method comprising:

generating, by a computer, using a rule-based classifier, a classification decision tree based on a plurality of features corresponding to transactions corresponding to an application comprised of a set of microservices in a microservice chain;

removing, by the computer, a set of features having low importance for the transactions from the classification decision tree using weakest link weight-based pruning to increase accuracy of failure risk classifications by the rule-based classifier;

reducing, by the computer, variance in predictions for microservice failures for particular failure types by the rule-based classifier utilizing a bagging technique and a boosting technique on the rule-based classifier;

predicting, by the computer, using the rule-based classifier, that failure of a microservice in the microservice chain will occur during a predicted high-risk failure period for a predicted failure type while performing a transaction corresponding to the application;

determining, by the computer, a detailed logging level for the microservice to record sufficient information to identify a root cause of the failure of the microservice for the predicted failure type; and directing, by the computer, the microservice to increase a current logging level of the microservice to the detailed logging level during the predicted high-risk failure period to record sufficient information to identify the root cause of the failure of the microservice.

2. The computer-implemented method of claim 1, further comprising:

storing, by the computer, details corresponding to the application, identification of the microservice in the microservice chain, the predicted high-risk failure period, and the predicted failure type in a knowledge corpus as new training data for the rule-based classifier.

3. The computer-implemented method of claim 1, further comprising:

sending, by the computer, a notification regarding a future predicted time of the failure of the microservice to the microservice.

4. The computer-implemented method of claim 1, further comprising:

performing, by the computer, a debug of the root cause of the failure of the microservice automatically.

5. The computer-implemented method of claim 1, further comprising:

receiving, by the computer, a subscription to a microservice failure prediction service for the application comprised of a set of microservices in the microservice chain that performs transactions corresponding to the application; and identifying, by the computer, each respective microservice of the set of microservices in the microservice chain in response to receiving the subscription.

6. The computer-implemented method of claim 1, further comprising:

collecting, by the computer, data corresponding to transactions performed by a set of microservices in the microservice chain during testing and initial run cycles of the application, the data indicating either a failure or a success of each respective transaction along with a type of the failure; and training, by the computer, the rule-based classifier utilizing the data corresponding to the transactions performed by the set of microservices in the microservice chain during the testing and initial run cycles of the application indicating one of the failure or the success of each respective transaction along with the type of the failure.

7. The computer-implemented method of claim 1, wherein the rule-based classifier utilizes the classification decision tree to generate an output that includes the predicted high-risk failure period.

8. The computer-implemented method of claim 1, wherein the predicted failure type is a data failure type.

9. A computer system for intelligent logging of microservice failures, the computer system comprising:

a communication fabric;

a storage device connected to the communication fabric, wherein the storage device stores program instructions; and a processor connected to the communication fabric, wherein the processor executes the program instructions to:

generate, using a rule-based classifier, a classification decision tree based on a plurality of features corresponding to transactions corresponding to an application comprised of a set of microservices in a microservice chain;

remove a set of features having low importance for the transactions from the classification decision tree using weakest link weight-based pruning to increase accuracy of failure risk classifications by the rule-based classifier;

reduce variance in predictions for microservice failures for particular failure types by the rule-based classifier utilizing a bagging technique and a boosting technique on the rule-based classifier;

predict, using the rule-based classifier, that failure of a microservice in the microservice chain will occur during a predicted high-risk failure period for a predicted failure type while performing a transaction corresponding to the application;

determine a detailed logging level for the microservice to record sufficient information to identify a root cause of the failure of the microservice for the predicted failure type; and direct the microservice to increase a current logging level of the microservice to the detailed logging level during the predicted high-risk failure period to record sufficient information to identify the root cause of the failure of the microservice.

10. The computer system of claim 9, wherein the processor further executes the program instructions to:

store details corresponding to the application, identification of the microservice in the microservice chain, the predicted high-risk failure period, and the predicted failure type in a knowledge corpus as new training data for the rule-based classifier.

11. The computer system of claim 9, wherein the processor further executes the program instructions to:

send a notification regarding a future predicted time of the failure of the microservice to the microservice.

12. The computer system of claim 9, wherein the processor further executes the program instructions to:

perform a debug of the root cause of the failure of the microservice automatically.

13. A computer program product for intelligent logging of microservice failures, the computer program product comprising a computer-readable storage medium having program instructions embodied therewith, the program instructions executable by a computer to cause the computer to perform a method of:

generating, by the computer, using a rule-based classifier, a classification decision tree based on a plurality of features corresponding to transactions corresponding to an application comprised of a set of microservices in a microservice chain;

removing, by the computer, a set of features having low importance for the transactions from the classification decision tree using weakest link weight-based pruning to increase accuracy of failure risk classifications by the rule-based classifier;

reducing, by the computer, variance in predictions for microservice failures for particular failure types by the rule-based classifier utilizing a bagging technique and a boosting technique on the rule-based classifier;

predicting, by the computer, using the rule-based classifier, that failure of a microservice in the microservice chain will occur during a predicted high-risk failure period for a predicted failure type while performing a transaction corresponding to the application;

determining, by the computer, a detailed logging level for the microservice to record sufficient information to identify a root cause of the failure of the microservice for the predicted failure type; and directing, by the computer, the microservice to increase a current logging level of the microservice to the detailed logging level during the predicted high-risk failure period to record sufficient information to identify the root cause of the failure of the microservice.

14. The computer program product of claim 13, further comprising:

storing, by the computer, details corresponding to the application, identification of the microservice in the microservice chain, the predicted high-risk failure period, and the predicted failure type in a knowledge corpus as new training data for the rule-based classifier.

15. The computer program product of claim 13, further comprising:

sending, by the computer, a notification regarding a future predicted time of the failure of the microservice to the microservice.

16. The computer program product of claim 13, further comprising:

performing, by the computer, a debug of the root cause of the failure of the microservice automatically.

17. The computer program product of claim 13, further comprising:

receiving, by the computer, a subscription to a microservice failure prediction service for the application comprised of a set of microservices in the microservice chain that performs transactions corresponding to the application; and identifying, by the computer, each respective microservice of the set of microservices in the microservice chain in response to receiving the subscription.

18. The computer program product of claim 13, further comprising:

collecting, by the computer, data corresponding to transactions performed by a set of microservices in the microservice chain during testing and initial run cycles of the application, the data indicating either a failure or a success of each respective transaction along with a type of the failure; and training, by the computer, the rule-based classifier utilizing the data corresponding to the transactions performed by the set of microservices in the microservice chain during the testing and initial run cycles of the application indicating one of the failure or the success of each respective transaction along with the type of the failure.

19. The computer program product of claim 18, wherein the rule-based classifier utilizes the classification decision tree to generate an output that includes the predicted high-risk failure period.

* * * * *